Sept. 13, 1960  C. B. ESTES  2,952,180
VISUAL OPTICAL INSTRUMENT HAVING A COMBINED
RETICLE AND FIELD FLATTENING ELEMENT
Filed June 2, 1958  2 Sheets-Sheet 1
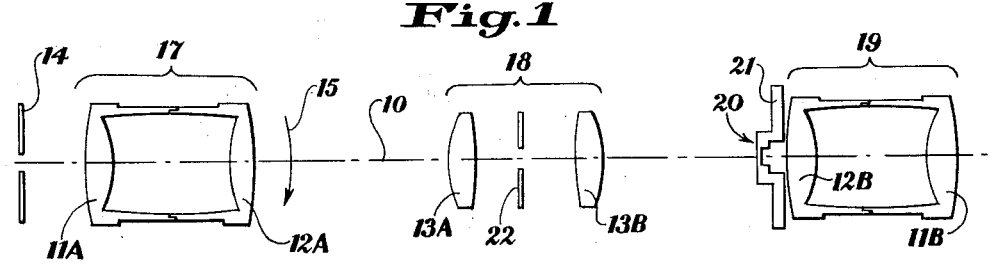
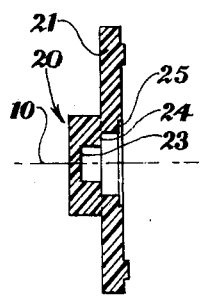
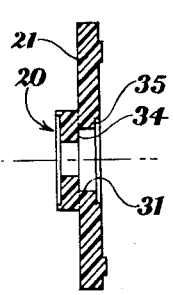
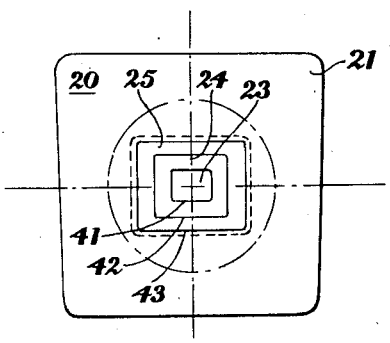
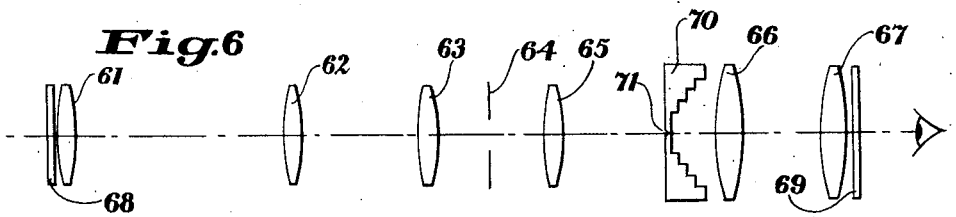
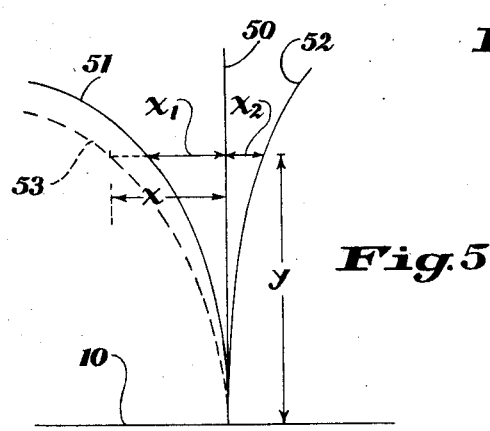
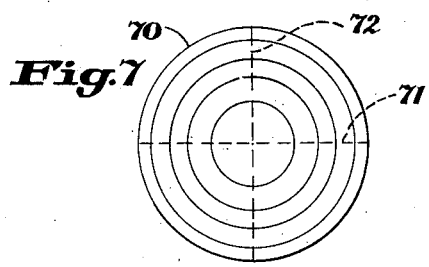
Cameron B. Estes
INVENTOR.
BY R. Frank Smith
Harold F. Bennett
ATTORNEY & AGENT Sept. 13, 1960 C. B. ESTES 2,952,180
VISUAL OPTICAL INSTRUMENT HAVING A COMBINED
RETICLE AND FIELD FLATTENING ELEMENT
Filed June 2, 1958 2 Sheets-Sheet 2
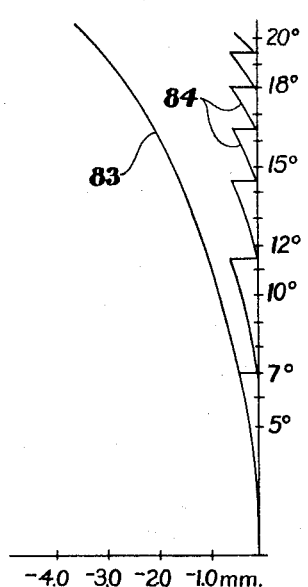
Fig.8
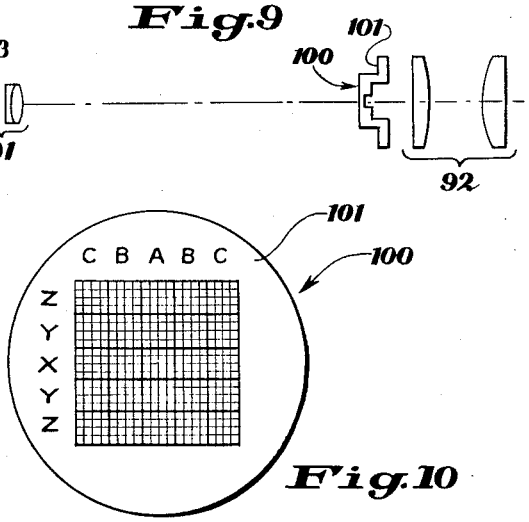
Fig.9
Fig.10
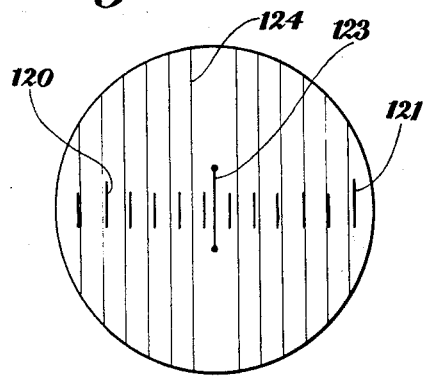
Fig.12
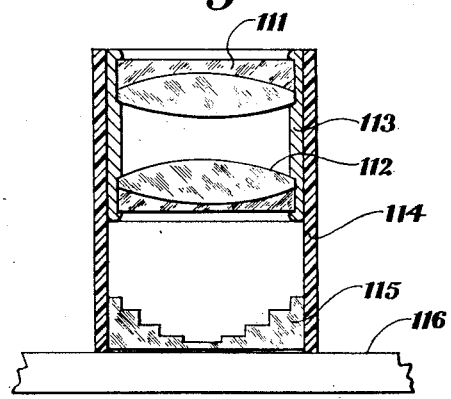
Fig.11
Fig.13
Fig.14
Cameron B. Estes
INVENTOR.
BY R. Frank Smith
Harold F. Bennett
ATTORNEY & AGENT

United States Patent Office 2,952,180
Patented Sept. 13, 1960

2,952,180
VISUAL OPTICAL INSTRUMENT HAVING A COMBINED RETICLE AND FIELD FLATTENING ELEMENT

Cameron B. Estes, Rochester, N.Y., assignor to Eastman Kodak Company, Rochester, N.Y., a corporation of New Jersey Filed June 2, 1958, Ser. No. 739,352

4 Claims. (Cl. 88—1.5)

This invention relates to optical systems for visual use and particularly to sighting instruments in which the field of view is marked off by a series of lines in a symmetrical arrangement around the center. It is also useful in optical instruments in which such a reticle does not interfere with the use of the instrument even though it may not be necessary thereto.

Examples of sighting instruments in which the invention is particularly useful are camera viewfinders, rifle telescopes, tachometric rangefinding telescopes, scale-reading telescopes and magnifiers, and microscopes, especially microscopes in which the field of view is divided into squares by a recticle for counting blood corpuscles or similar small objects.

It is well known in optical theory that a system consisting exclusively of positive lens elements can never be corrected for curvature of field and astigmatism at the same time, since the Petzval sum ($\Sigma 1/nf$) must equal nearly zero to obtain a flat anastigmatic field. The introduction of negative lenses in a system consisting basically of positive members makes the instrument more complex and expensive. Previous attempts to simultaneously flatten the field and correct the astigmatism of sighting telescopes involve strong negative lenses at or near the image plane, as shown in U.S. 1,468,762, Taylor and Taylor, or complex and expensive objectives or erector lenses as shown in 2,430,549, Altman.

An object of the present invention is to provide a simple and inexpensive optical arrangement for flattening the field of an optical instrument.

A further object of the present invention is to provide a single optical means for flattening the field of an optical instrument and for providing a generally concentric pattern on a recticle plate.

A specific object of the invention is to provide a reticle plate which has discrete changes in thickness at reticle lines, such changes of thickness being predetermined to substantially improve the curvature of field of the instrument with which it is intended to be used.

Another object of the invention is to provide an optical system which consists exclusively of lens components of positive power and which has a substantially flat field.

An object of a particular form of the invention is to provide a viewfinder, and particularly a telescopic viewfinder, for use with a camera adapted to selectively cover a plurality of different fields of view, said viewfinder including a single optical means for flattening its field and for outlining a corresponding plurality of fields of view.

Cameras are known which are adapted to selectively cover a plurality of fields of view. In some cases this is done by masks interposed at the film plane. In others the camera is provided with a plurality of objective systems having different focal lengths and hence covering different angular fields of view on the same film format. The plurality of objective systems for the camera may be made up as a plurality of interchangeable objectives or as a single objective with telephoto and wide-angle attachments or as a series of interchangeable front halves of an objective system the rear half of which remains fixed.

It is also known to use sighting telescopes as finders on movie cameras so that the eyepoint will be brought to the back end of the camera, and such sights usually consist of an objective lens which images the object field into a real image field, an erector which may be either an erecting prism of known type or a relay lens for reimaging the first image field into a second image field, and an eyepiece for viewing the second image field. Conveniently, such sighting telescopes are made up in unit power, and this arrangement provides certain economies in production, but they are not restricted to unit power.

According to one form of the invention an optical sighting instrument is made up of a simple or compound objective means for forming a real image of an object to be sighted and eyepiece means aligned therewith for viewing this image. Either or both of said means may include one or more relay stages although usually each is a single lens group. In any case each of said means has a positive Petzval sum and undercorrected curvature of field. A transparent reticle member is located substantially at the real image field to serve two purposes. This member is shaped with its thickness increasing in discrete steps, through a plurality of zones from the axis outward, each step being flat and orthogonal to the axis. This decreases the curvature of field of the instrument. The sides (or risers) of the steps demarcate zones of the image as viewed by the observer and constitute lines in the reticle pattern itself which may be of any symmetrical zonal form, for example concentric circles or concentric similar rectangles.

Preferably the increase in thickness at each step, is predetermined to correspond more or less precisely to the degree of undercorrection of the curvature of field of the optical system for flattening the field to within a predetermined tolerance. According to a highly preferred form of the present invention this correspondence is according to known optical laws and is such that the height of the riser between one zone and the next is equal to $$\frac{1}{(n-1)}$$

times the difference in image displacement required in the two zones to substantially completely correct the curvature of field. This relationship will be elucidated by examples below.

According to another form of the invention an optical instrument is made up comprising an objective system for forming a real image of an object field, in which the curvature of field due to the objective system is substantial, and this real image is relayed onto a screen or onto a photographic film by a corrected optical system or is viewed through an eyepiece which has negligible curvature of field, the essential feature being that the curvature of field of the objective system is to be substantially corrected. In this form of the invention the transparent reticle member as above described is ordinarily located at the real image but optionally at the object field in the case of a microscope or other finite-conjugate system, and the steps of increasing thickness are determined so as to decrease or substantially correct the curvature of field due to the objective. The term "focal field" is hereinafter used generically to denote either the object field or a real image of the object field.

According to still another form of the invention, an optical sighting instrument is made up comprising an eyepiece having a positive Petzval sum and undercorrected curvature of field for viewing an object field. The object field of the eyepiece may be either a real object or a real image formed by an objective system and may be either curved or flat. In this form of the invention the transparent reticle member as above described is located approximately at the object field of the eyepiece, and the steps of increasing thickness are such as to decrease or substantially correct the curvature error of the eyepiece throughout said plurality of zones of the reticle member. It is customary to define an eyepoint on the axis of the eyepiece and on the opposite side of the eyepiece from the object field, the eyepoint being the approximate position of the observer's eye for which the eyepiece is designed to be used. The "curvature error of the eyepiece" at any point in the object field is defined as the distance from the object field of the eyepiece to the locus of the image formed by a bundle of reverse rays from a very distant point as focused by the eyepiece, and particularly to the image point formed by a small bundle of reverse rays the central ray of which passes through the eyepoint before and through the given field point after traversing the eyepiece.

According to a special feature of the invention, a system of any of the types discussed above is made up exclusively of lens components of positive power with which is combined the field flattening reticle member according to the invention. Elements of zero power such as windows or prisms are not considered as lens components in this connection. One or more of the positive lens components may, of course, be achromatized by combining a positive and a negative element in close proximity.

The positive Petzval sum and undercorrected curvature of field previously mentioned are not features which one goes out of one's way to provide when using the invention, but they just come naturally, and the invention provides a very inexpensive and practical means of eliminating the disadvantages thereof.

Further objects of the invention will be apparent from the following description of specific embodiments with reference to the accompanying drawing in which:

Fig. 1 shows in diagrammatic axial section a unit sight according to the invention intended for use with a motion-picture camera.

Fig. 2 shows in axial section the field flattener 20 of Fig. 1.

Fig. 3 shows an optional variant of Fig. 2.

Fig. 4 is a rear elevation of Fig. 2 and of Fig. 3.

Fig. 5 is a graph showing the curvature of field of the unit sight of Fig. 1.

Fig. 6 shows an optical system according to the invention adapted for use as a rifle sighting telescope.

Fig. 7 is a rear elevation of the field flattener 70 of Fig. 6.

Fig. 8 is a graph showing the required image curvature correction and the corrected curvature of a specific example according to Fig. 6.

Fig. 9 shows in axial diagrammatic section a microscope system embodying the invention.

Fig. 10 is a rear elevation of the field flattener 100 of Fig. 9.

Fig. 11 shows a loupe or a magnifying glass embodying the invention.

Fig. 12 shows the appearance of the field of view of a system according to Fig. 9 or Fig. 11 made up as a vernier scale reader.

Figs. 13 and 14 show optional forms of the field flattening reticles 20, 70 and 100 of Figs. 1, 6 and 9.

In Fig. 1 a unit sight suitable for use as a view-finder in a motion-picture camera is shown in diagrammatic axial section. In this sighting telescope an objective 17 having a diaphragm 14 in front thereof and consisting of two simple positive lens components 11A and 12A forms an image 15 of a distant object field, the image being curved and being positioned a short distance behind the objective 17. Aligned with the objective on the axis 10 is an erector or relay lens group 18 consisting of two simple positive lens components 13A and 13B. The image 15 acts as the object for the erector system and the erector system reimages the object field at a position symmetrical to the first image 15. This second image (not shown) is curved concave to the left, however, in the same direction as the first image 15 but with a stronger curvature. The field flattener 20, which constitutes the principal novel feature of the invention is located at this focal plane. Also axially aligned with the objective and erector is an eyepiece 19 consisting of two simple positive lens components 12B and 11B. The image (not shown) formed by the erector or relay lens acts as the object for the eyepiece and is viewed through the eyepiece, the observer's eye being preferably placed at the eye point beyond the edge of the diagram.

This sighting system is preferably made up as a symmetrical system, that is, the objective 17 is identical with and symmetrical to the eyepiece 19 and the two lenses 13A and 13B of the relay member are identical to each other and arranged symmetrically with respect to the axial point mid-way therebetween. The advantages of a symmetrical system in correcting the transverse aberrations are well known. As a matter of fact, all six lens components can be made identical with a resulting economy in production and a system has been made up in which the weaker curve of each lens element has a 60.65 mm. radius while the stronger curve has a 14.13 mm. radius the thickness at the axis being 3.38 mm. and the clear diameter being approximately 13 mm., and such a system has been found quite satisfactory for the intended purpose. The two elements of the objective are preferably spaced apart 15.77 mm. at the axis, and the same is true of the eyepiece. The objective and eyepiece are preferably each mounted 27.05 mm. from the respective adjacent component of the relay lens. The latter space may be varied slightly during assembly so as to give collimated light in the central space between the two components of the relay lens. For quantity production, these elements may economically be injection-molded of a transparent plastic, for example methyl methacrylate which has a refractive index of 1.49. By providing collimated light in the central space, it is practicable to vary this central space during assembly to adjust the over-all length of the telescope system to the prescribed value and alternatively to adapt the system for use on other models of motion-picture cameras requiring a somewhat different over-all length. Ordinarily, in a symmetrical unit sight the diaphragm 22 is placed at the center of the central space. Optionally, however, the diaphragm may be shifted toward the rear component 13B of the relay lens for reasons which will be explained in the description of the field flattener 20.

Fig. 2 shows in axial section a preferred form and Fig. 3 an optional form of the field flattener 20 according to the invention, and Fig. 4 shows the same part in rear elevation. The field flattener 20 as shown in Figs. 2 and 4 is preferably a molded plastic element having three zones of different thicknesses, the central zone 23 having a thickness $t_1$, the next zone 24 having a thickness $t_2$ and the outer zone 25 having a thickness $t_3$. As shown in Fig. 4, each zone is in the form of a rectangle in outline, the rectangles 41, 42, 43 having the proportions of the picture which is to be taken in the camera and their sizes corresponding to the angular fields of the objective systems of the camera. The differentials of thickness $(t_2-t_1)$ and $(t_3-t_1)$ are predetermined with respect to the curvature of field which is to be corrected, and which is shown diagrammatically in Fig. 5.

Fig. 3 shows an optional form of the field flattener 20 and differs from Fig. 2 in that the thickness $t_1$ at the axis is zero, i.e. there is an aperture corresponding to the central zone 23 and the thicknesses of the other zones 34 and 35 are less than the corresponding thicknesses of zones 24 and 25 of Fig. 2 by equal amounts. The rear elevation would appear the same as that of Fig. 2 which is shown in Fig. 4.

The fin or mounting disk 21 is provided around the outside of the field flattener for convenience in mounting. Certain problems in the injection molding of parts of this shape have been encountered and it has been found that the mold is filled more smoothly with the liquid plastic if made up in the form shown in Fig. 2 in which there is at least a small thickness at the center. If made up in the form shown in Fig. 3, the liquid which enters the mold at one side tends to divide around the central opening and to meet on the opposite side, leaving small marks, or "weld marks" as they are called in the trade, where the two streams meet. Also, as is well known, it is not practical to mold a piece of this sort with the steps or risers, for example, 31, in Fig. 3, exactly parallel with the axis, but rather these risers must diverge by a degree or two in order to be able to pull apart the two parts of the mold without spoiling the molded element. It is advantageous to have the principal rays of the system pass through the field corrector 20 grazing, that is substantially parallel to, the risers just mentioned; this arrangement makes sharper lines in the reticle pattern. To do this, the principal rays should be made divergent by about a degree or two at this point in the system. This is done during design in known manner by choosing the focal lengths and separation of the erector lenses 13A and 13B so as to make the virtual image of the diaphragm 22 appear at a suitable distance from the eyepiece (about 200 times the length of the medium sized rectangle 42, Fig. 4). This divergence in the principal rays also tends to increase the eye relief.

Fig. 5 is a mathematical diagram showing the ideal image plane 50, the curvature of field 51 of the image formed by the erector and relay system and the curvature of field 52 of the focal surface of the eyepiece 19. At a distance $y$ from the axis 10 the curve 51 is at a distance $x_1$ from the ideal plane 50 and the curve 52 is at a distance $x_2$. In the diagram $x_2$ is positive and $x_1$ is negative so that the distance between the two curves 52 and 51 is $x_1 - x_2 = x$. This distance x presents the total field curvature to be corrected and is shown by the dotted curve 53. It is negative in this example.

Mathematically, the thickness differentials are found by the following method which is usually close enough:

The curvature 53 which is to be corrected is expressed approximately as a parabola, $x = a + by^2$. An average of the curvature of field over each zone is computed as follows: Each zone lies between a smaller rectangle and a larger rectangle, for example, zone 24 of Fig. 4 lies between the smallest rectangle 41 and the intermediate rectangle 42. If the semi-diagonal of the smallest rectangle is $d_1$ and that of the intermediate rectangle is $d_2$ then the average image curvature to be corrected is found by a double integration by standard methods to be equal to $a + \frac{1}{3}b(d_1^2 + d_2^2)$ for the second zone 24 and similarly for the third or outer zone 25. The average image curvature to be corrected in the inner zone 23 is found by setting one diagonal equal to zero and is thus $a + \frac{1}{3}bd_1^2$. The differential image displacement for each zone is then the average of the image curvature over that zone minus the average of the image curvature over the inner zone, i.e. it is 0, $\frac{1}{3}bd_2^2$ and $\frac{1}{3}b(d_3^2 + d_2^2 - d_1^2)$ in the respective zones. The differentials of thickness are found by dividing the above differentials by $(n-1)$ and changing the sign to positive.

In case the field curve is not approximated exactly enough by a single parabola it may be approximated by a series of parabolas $x = a_i + b_i y^2$ where the subscript $i$ denotes the respective zones numbered 1, 2, 3 from the center outward. The average image curvature to be corrected in each zone is then $a_i + \frac{1}{3}b_i(d_i^2 + d_{i-1}^2)$ where $d_0 = 0$ and $d_1, d_2, d_3 \ldots$ represents the semi-diagonals of the respective rectangles numbered from the center outward. The thickness differentials are found from the average image curvatures in the same way as before.

This method reduces to the simpler one by making $a$ and $b$ equal in all zones.

The curvature of field may be computed by standard methods or measured on a lens bench in the usual way. Alternatively an observer may rack the eyepiece in and out to successively get the best focus for the respective zones and then measure the movements of the eyepiece. This gives directly the differentials of image displacement, whereupon the differentials of thickness are found by dividing by $(n-1)$ as before.

Fig. 6 shows in diagrammatic axial section a 4-power telescope embodying the invention and useful as a rifle sight. The optical system of this telescope comprises an objective lens 61, a field lens 62 which images the objective lens 61 at the diaphragm 64, an erector or relay system including lenses 63 and 65, a field flattener 70 according to the invention and an eyepiece comprising two lenses 66 and 67. If these lens elements are made of plastic, it is preferable to provide cover plates 68 and 69 at the two ends of the optical system to reduce the damage from abrasion. The lens elements of this telescope are in general accord with the prior art, except that no attempt is made during design to completely flatten the field by introducing negative astigmatism.

Fig. 7 shows the field flattener 70 in rear elevation. This part corresponds to the field flattener 20 of Figs. 1, 2, 3 and 4, except that it is preferable to have a larger number of zones of different thickness and it is customary to have circular zones as shown rather than rectangular ones. Also crosslines are provided by making small grooves 71, 72, on the smooth side of the field flattener 70. Groove 71 is shown greatly exaggerated in Fig. 6. The curvature of field to be corrected is determined in the same manner as explained in the case of the unit sight of Fig. 1 with reference to Fig. 5, and the average image curvature over the $i$th circular zone is given by the formula $a_i + \frac{1}{2}b(R_i^2 + R_{i-1}^2)$ where the curved field to be corrected is approximated by the parabola $a + by^2$ as before, and where $R_0$ is zero and $R_i$ is the semi-diameter (outer) of the $i$th zone numbered from the center outward. The differentials of thickness are determined from the differentials of image curvature of the several zones in the same way as before. Also, the differentials of image curvature may optionally be measured by direct observation as described before.

Fig. 8 shows the total image curvature 83 of a telescope which has been made up according to Fig. 6 without the field corrector 70 and the resulting field curvature, shown by a sawtooth line 84, with the field corrector 70 included.

Fig. 9 is a schematic diagram of a microscope system embodying the invention. This system comprises an objective 91 of conventional design which images the object 93 in or near the field flattener 100. This image then acts as an object which is optionally viewed by the eyepiece 92 also of conventional design or is projected or is photographed by a camera in known manner.

The field flattener 100 may have circular zones as shown in Fig. 7 or rectangular zones as shown in Fig. 4 but in a particularly useful form of the invention, useful in biological microscopes used in counting blood corpuscles or dust particles and the like, it is made up in a form shown in rear elevation in Fig. 10.

Fig. 10 shows this preferred form of the field corrector 100 of Fig. 9. As in Fig. 2, it is preferably provided with a fin 101 for convenience in mounting. The optically effective portion of the field corrector is made up as a plurality of square areas of which twenty-five are shown. Designating each block by the letter above and the letter to the side thereof in Fig. 10, the central square area AX has an optional thickness which is designated as $t_1$ as before. If, as before, the field curvature to be corrected is assumed to be represented by the parabola $x = by^2$ and the length of each side of each square area is $s$ then the average image curvatures of the respective square areas of Fig. 10, are as follows: For the central area AX, $bs^2/6$; for the four areas AY and BX, $7bs^2/6$; for the four areas AZ and CX, $25bs^2/6$; for the four diagonal squares BY, $13bs^2/6$; for the four corner squares CZ, $49bs^2/6$, and for the eight knight's move squares BZ and CY, $31bs^2/6$. The thicknesses of the field corrector 100 at the several areas are related to the average image curvatures in the same way as the thicknesses of the zones in the forms of the invention above described. The surface of each block is marked with three fine lines in each direction so as to divide it into 16 small squares in the customary way.

Fig. 11 shows a loupe or magnifier in accordance with the invention. Two lens components 111 and 112 are mounted in a metal ring 113 in the usual way and this whole assembly is mounted in a transparent plastic tube 114 at the bottom end of which is mounted a field flattening element 115 in accordance with the invention. The tube 114 extends slightly beyond the field flattening element so as to rest on the surface 116 which is to be examined through the magnifier and to hold the field flattening element 115 slightly clear of said surface to reduce the abrasion of the bottom surface thereof. The thicknesses of the zones of the element 115 are computed in the same manner as before and the lenses 111 and 112 may be made up in any suitable manner, a great many designs for magnifiers, loupes and eyepieces being known.

Fig. 12 shows another contemplated use for the invention in a scale reading magnifier or microscope. The appearance of the field of view is shown in which the scale marks 120 and 121 of the scale with nine shorter scale marks between are viewed through a magnifier or microscope having a field-flattening reticle in which the zones are long parallel vertical bands, the index mark 123 being marked in the center of the central zone and the boundaries such as 124 being equally spaced at a predetermined distance so as to give a vernier effect in co-operation with the scale being read. The differential thicknesses are substantially the same as for circular zones.

Figs. 13 and 14 show field-flattening reticles as above described in which the smooth side is given a finite curvature, positive and negative respectively. This curvature is ordinarily spherical but optionally may be aspherical and is chosen so as to "bend" the whole reticle member to keep the steps between zones sharply in focus or so as to redirect the principal rays, for example in case an existing eyepiece is to be used in combination with an objective system for which it is not specifically designed, or for a compromise between these two goals, or in special cases for both purposes.

It is to be pointed out that a great improvement in the curvature of field of a visual instrument is obtained if the theoretical thicknesses are only roughly equalled in the actual instrument.

The invention has been described in detail with particular reference to preferred embodiments thereof, but it will be understood that variations and modifications can be effected within the spirit and scope of the invention as described hereinabove and as defined in the appended claims.

It is pointed out that in the above specification and in the appended claims, when a field outline in a finder is said to "correspond to" a field of view of a camera exact matching is not meant, since it is usual to make the field of the finder about 5% smaller than that of the camera.

I claim:

1. A field flattening reticle member for axial alignment in an image plane of a camera viewfinder, which consists of a unitary body of molded transparent material of such shape that its thickness increases in discrete steps through three successive zones from the axis outward, each zone being substantially flat and orthogonal to the axis for correcting the curvature of field of said viewfinder, characterized by the outer boundaries of said three zones being three similar rectangles centered upon the axis and progressively larger in size to correspond to the respective fields of view covered by a corresponding series of objective systems of progressively longer focal length.

2. A camera viewfinder for use with a camera having three interchangeable objective systems, comprising a telescope system of the type having a real image plane, and a reticle member located at the real image plane, in which said telescope system comprises an objective, a relay member and an eyepiece in optical axial alignment, said objective consisting of two positive components separated by an airspace, said relay member consisting of two positive components separated by an airspace and having an aperture stop therebetween, and said eyepiece consisting of two positive components separated by an airspace, and in which said reticle member consists of a unitary molded body of transparent material axially aligned with said parts of said telescope and of such shape that its thickness increases in discrete steps through three successive zones from the axis outward, each step being substantially flat and orthogonal to the axis, whereby the curvature of field of said finder is substantially corrected, characterized by the outer boundaries of said three zones being three similar rectangles which respectively correspond to the respective fields of view covered by the said three interchangeable objective systems.

3. A field flattening reticle according to claim 1 in which the middle one of said three rectangles is at most equal in size to the average of the inner and outer rectangles and in which said steps of increased thickness are unequal.

4. A viewfinder according to claim 2 in which the middle one of said three rectangles is at most equal in size to the average of the inner and outer rectangles and in which said steps of increased thickness are unequal.

References Cited in the file of this patent

FOREIGN PATENTS 373,755    Germany _____ Apr. 16, 1923